United States Patent
Goldberg

(10) Patent No.: US 6,647,319 B1
(45) Date of Patent: Nov. 11, 2003

(54) IRRIGATION CONTROLLER

(75) Inventor: Allan M. Goldberg, Laguna Niguel, CA (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 09/510,489

(22) Filed: Feb. 23, 2000

Related U.S. Application Data

(60) Provisional application No. 60/121,220, filed on Feb. 23, 1999.

(51) Int. Cl.[7] .......................... G05D 11/02; G05B 11/01
(52) U.S. Cl. .......................... 700/284; 700/15; 700/19; 700/17; 239/69
(58) Field of Search .................. 700/14–16, 19, 700/284, 17; 239/67, 69, 70; 137/624.21, 624.18, 624.11

(56) References Cited

U.S. PATENT DOCUMENTS

| | | | |
|---|---|---|---|
| 4,646,224 A | * | 2/1987 | Ransburg et al. ............. 700/14 |
| 5,272,620 A | * | 12/1993 | Mock et al. ................... 700/16 |
| 5,293,554 A | * | 3/1994 | Nicholson .................... 700/284 |
| 5,444,611 A | * | 8/1995 | Woytowitz et al. ........... 700/16 |
| 5,602,728 A | * | 2/1997 | Madden et al. ............... 700/16 |
| 6,240,325 B1 | * | 5/2001 | Brundisini .................... 700/19 |
| 6,240,336 B1 | * | 5/2001 | Brundisini .................. 700/284 |
| 6,259,955 B1 | * | 7/2001 | Brundisini et al. ........... 700/15 |

OTHER PUBLICATIONS

Single station controllers Valve controllers DID 60 and DID 2000 (admitted prior art).*

* cited by examiner

*Primary Examiner*—Leo Picard
*Assistant Examiner*—Steven R. Garland
(74) *Attorney, Agent, or Firm*—Stout, Uxa, Buyan & Mulins, LLP

(57) ABSTRACT

A simple, inexpensive multi-station sprinkler controller has three pushbuttons: the first selects one of a plurality of predetermined combinations of watering cycle durations and repetition rates; the second selects a starting time, and the third initiates a manual cycle. On power-up, the controller defaults to a predetermined operating cycle and start time. A short circuit at any station stops watering and initiates a fault indication that identifies the short-circuited station. All status information is conveyed by the scrolling, illumination, flashing and/or blinking of one or more of a small set of LEDs. In another embodiment, a fourth pushbutton is provided to allow setting separate combinations for different stations. In a third embodiment, these functions are performed in a single-station controller by just two buttons and one LED.

4 Claims, 7 Drawing Sheets

US 6,647,319 B1

IRRIGATION CONTROLLER

This application claims the benefit of U.S. Provisional Application No. 60/121,220 filed Feb. 23, 1999.

FIELD OF THE INVENTION

This invention relates to irrigation controllers, and more particularly to a single- or multi-station controller which is inexpensive and easy to program, and which uses only a minimal set of pushbutton controls and simple indicators to carry out relatively complex programming functions.

BACKGROUND OF THE INVENTION

A large variety of controllers are commercially available for controlling the automatic operation of irrigation sprinklers in residential and industrial applications. These controllers vary in complexity and cost all the way from single-station, battery-powered units with few programming options that are mounted directly on a water valve, to complex, computer-programmable wall-mounted units capable of operating a complex irrigation system with many stations that require different operating parameters. Existing controllers are generally complicated and time-consuming for an unskilled owner to program. This causes many home controllers to be set once upon installation, and not to be periodically readjusted to fit changing conditions.

For this reason, and also because of the price consciousness of most homeowners, a need exists for both a single-station and a multi-station controller that is simple and inexpensive, powers up with a useful default set of operating parameters upon installation, and is simple to set to different parameters at any time.

SUMMARY OF THE INVENTION

The present invention fills the above-described need by providing, in the first two embodiments described herein, a multi-station controller with three pushbuttons that select, respectively one of a set of predetermined combinations of water cycle length and repetition rate (i.e. the number of days between watering cycles); a start time-of-day; and a manual operation. On power-up, the inventive controller defaults to a generally appropriate cycle length, repetition rate and start time, which can then be changed by pushing the buttons. Alternatively, with an extra button as shown in the second embodiment, the watering time for each station can be set individually.

Operational parameter settings and controller status are indicated in the inventive controller by a set of simple indicators such as lights or light-emitting diodes (LEDs), preferably at least one for each cycle (in the first embodiment) or station (in the second embodiment), which convey information by their combinations and actions (e.g. scrolling, illumination, flashing and/or blinking).

If only a single station is to be controlled, as in the third embodiment described herein, the functions of the controller can be performed with only two pushbuttons, by using one or both pushbuttons.

DESCRIPTION OF THE PREFERRED EMBODIMENT

Figure 1:
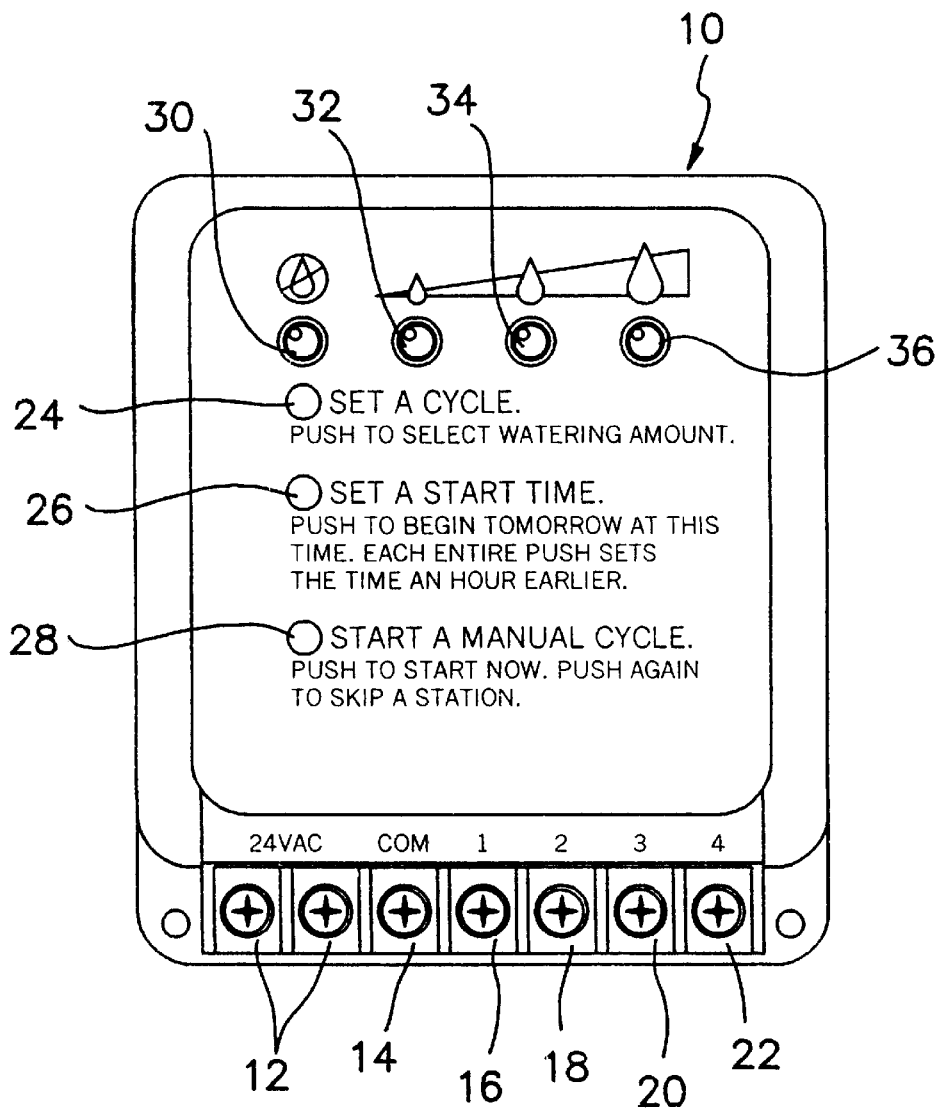
FIG. 1 is a front elevation of the face plate of a preferred embodiment of the invention.

FIG. 1 illustrates the simple face plate 10 of a representative embodiment of the invention. At the bottom of the face plate 10, connectors 12 are the power inputs to the inventive controller (typically 24 V AC for safety); connector 14 is the common ground for the four watering stations; and connectors 16, 18, 20 and 22 are the switched terminals of the four watering stations.

Pushbutton 24 sets the watering cycle length and repetition rate; pushbutton 26 sets the start time; and pushbutton 28 starts a manual cycle. Indicator lights 30, 32, 34 and 36 provide information on the controller status and settings as described below.

The controller of this invention is intended for the homeowner market. Consequently, simplicity of operation and low cost are dominant considerations, even though they come at the expense of versatility. In this regard, it has been found that homeowners with little gardening skills or interest, at least in the warmer climates, do not care to repeatedly fine-tune their sprinkler systems. Such homeowners are only interested in setting their sprinklers to seasonal changes in watering conditions, to run them manually when necessary, or to turn them off during protracted periods of rain. It is therefore possible to determine, based on the climatic conditions of a particular market, a set of cycle length and repetition rate parameters that is generally suitable for a given season in that market.

The present invention makes use of this fact in reducing the complexity and cost of a controller by combining cycle lengths and repetition rate settings into a set of single settings such as heavy (summer), medium (spring/fall) and light (winter) watering. Thus, the homeowner merely needs to select a watering level and a start time, and the controller does the rest. To accommodate special situations, a no-watering setting and a manual start for a selected station or stations are provided.

Figure 2:
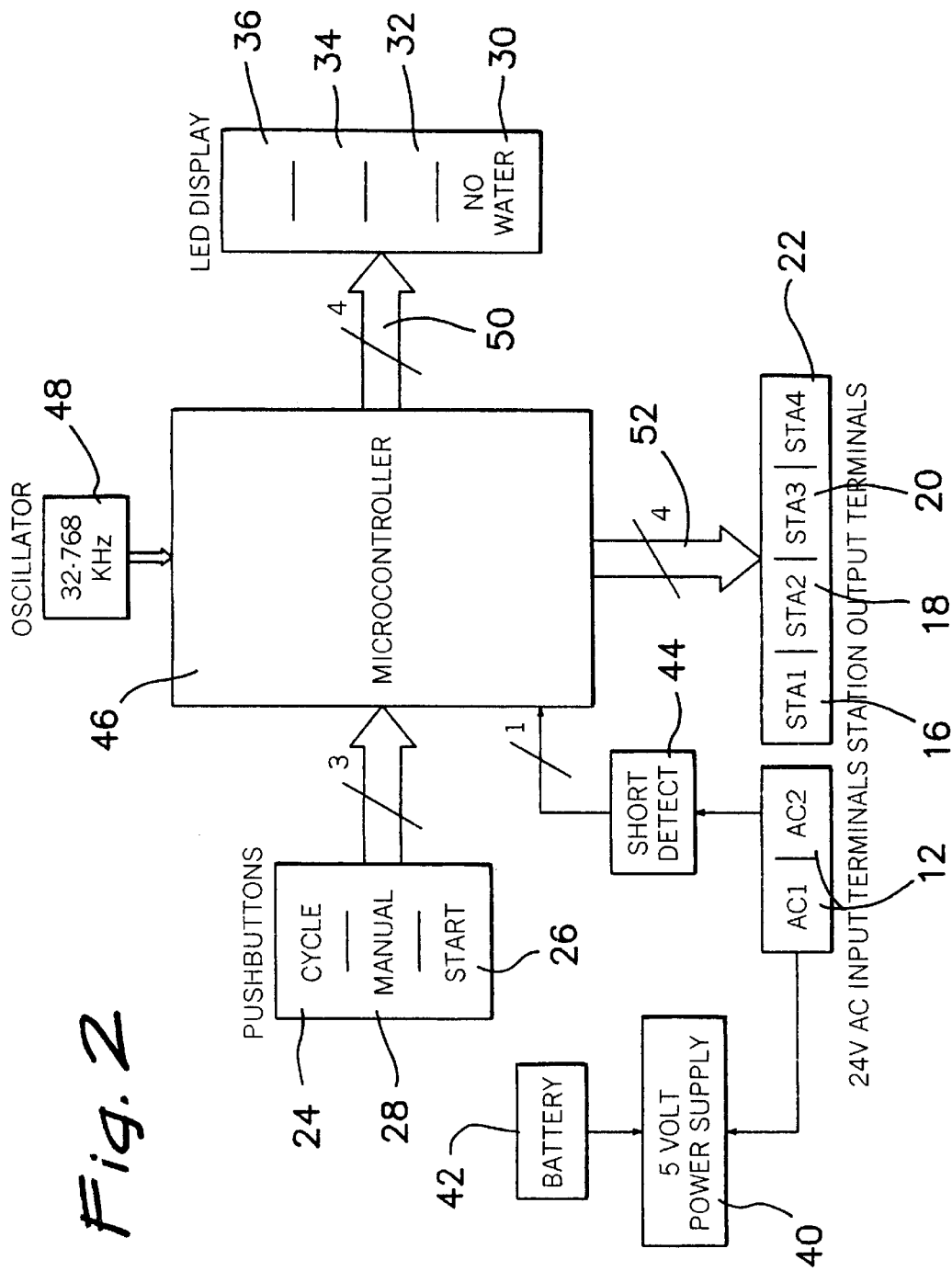
FIG. 2 is a block diagram of the circuitry of the controller of FIG. 1.

FIG. 2 outlines the overall architecture of the controller of this invention. 24V AC power is applied to terminals 12. The input power operates a 5V DC power converter 40 which powers the control electronics of the controller. A battery 42 may be connected to the converter 40 as a stand-by power source if desired.

A short circuit detector 44 monitors the current drawn by each station output 16 through 22 from the input 12 for one full AC cycle, i.e. 16.7 ms, on power-up, and also monitors it continually whenever a station is on. If an overcurrent indicative of a short circuit occurs, the detector 44 sends a signal to the microcontroller 46 to shut off all stations and flash all the LEDs 30 through 36 with a blinking code indicating the station which was energized when the short was detected.

The internal clock for the microcontroller 46 is provided by an oscillator 48 which, in the preferred embodiments, operates at 32.768 kHz in order for the clock timer to synchronize with real time. The operations of microcontroller 46 are controlled, as detailed below, by the pushbuttons 24, 26 and 28. The outputs of microcontroller 46 are the lines 50 to the LEDs 30 through 36, and the lines 52 which selectively enable one of the station outputs 16 through 22 to be connected to the power input 12.

Figure 3:
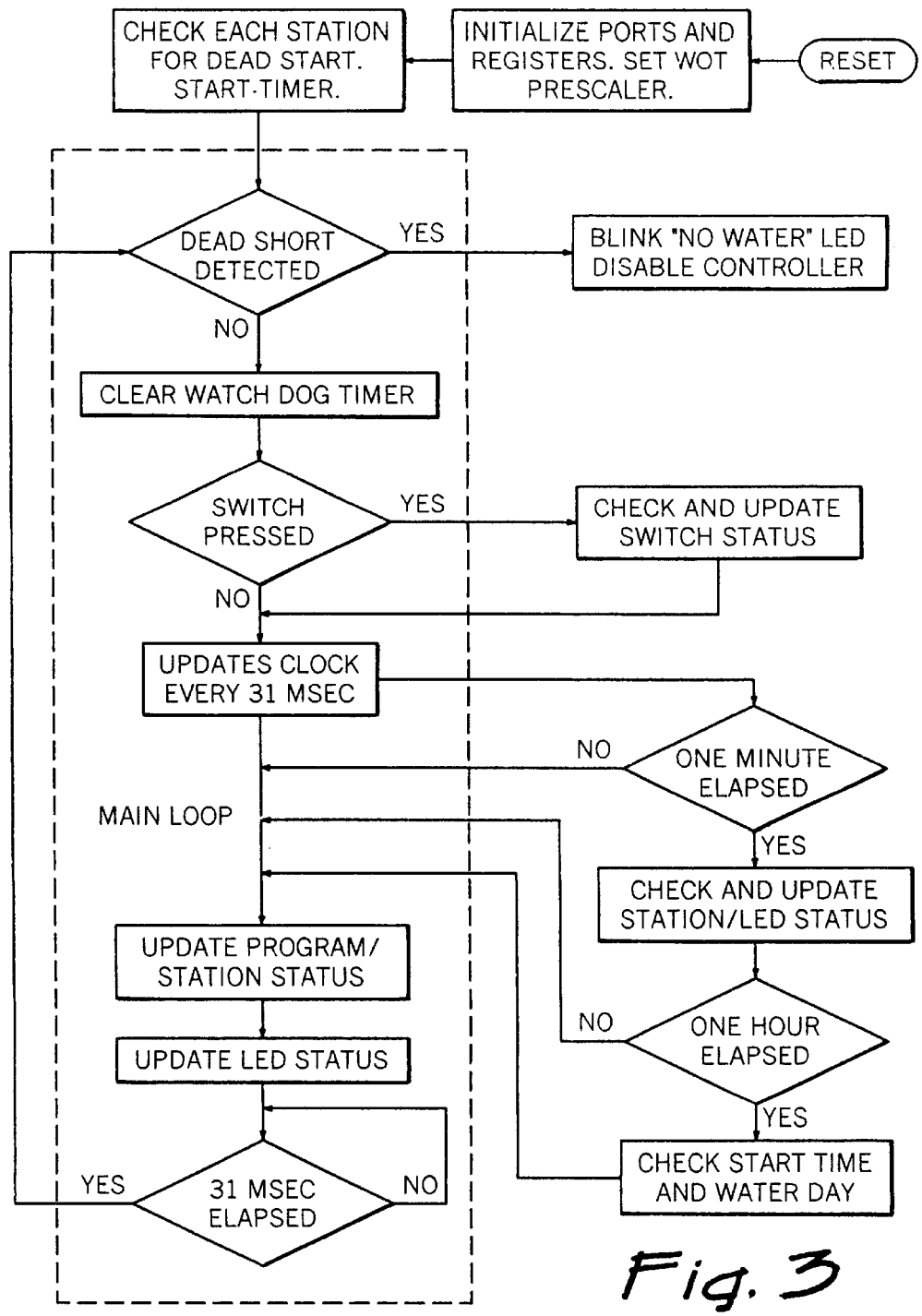
FIG. 3 is a flow chart of the operation of the microcontrollers of FIGS. 2 and 5.

FIG. 3 shows the basic operation of the microcontroller 46. Upon power-up or a watchdog timer reset, the microcontroller's ports and registers are initialized to their default settings, which preferably include the medium watering cycle and a start time of twenty-four hours after power-up. The LEDs 30 through 36 are set to scroll. The microcontroller's built-in watchdog timer (WDT) is scaled to about 1 second. Each station is next sequentially checked for short circuits as described above, and the watchdog timer is started. If a short circuit has been detected, the controller is disabled and the short-indicating LEDs are set to flash with a blinking code indicative of the station on which the short circuit was detected, i.e. once for station 16, twice for station 18, three times for station 20, and four times for station 22.

If a short circuit is not detected on the power-up test, the program next resets the watchdog timer and tests to see if a pushbutton has been pressed. If one has, the program updates the microcontroller register status indicated by that pushbutton. In either event, the program next updates the microcontroller's event timing clock registers. On each main loop iteration, which is preferably programmed to be 31.25 ms, the program increments and checks the timing registers. Once the seconds timing register has been incremented to indicate that a minute has elapsed, the program checks and updates the station status and LED status based on the parameters then selected or defaulted to, as the case may be. Once the minutes timing register has been incremented to indicate that an hour has elapsed, the program checks whether the start time has been reached and whether the present day is the correct day for watering. If both are true, the program initiates a watering cycle.

On each iteration of the program's main loop, the program, station, and LED statuses are updated, and the program then waits for the next iteration. Inasmuch as the watchdog timer is reset on each 31.25 ms iteration, it does not time out unless a software glitch stops the iteration of the main loop in FIG. 3. In that case, the watchdog timer does time out and resets the controller to the power-up mode.

The microcontroller program is preferably arranged to carry out the operation of the controller in accordance with pushbutton operation as follows: Upon power-up, the cycle setting defaults to medium watering, and the start time defaults to twenty-four hours from power-up. The four LEDs 30 through 36 flash in succession, i.e. scroll, thereby calling attention to the condition that power had shut off so that any previously selected start time and cycle settings were lost; and that, at the time power was restored, the start time and cycle setting reverted to their default values. When one of the pushbuttons 24, 26 or 28 is pressed, or a watering cycle starts, LED 34 lights and stays on. Each time a button is pressed, a short flash of all four LEDs 30 through 36 indicates that electrical contact has been, made. The pushbuttons 24, 26 and 28 are preferably software-debounced in a conventional manner so that contact noise will not result in multiple operations. Software control also prevents continuous pressing from inadvertently causing the user to make an incorrect selection.

If a different watering cycle than medium watering is desired, pushbutton 24 must be pushed, repeatedly if necessary, to select high, low or no watering.

If watering is to start at a time of day different than the time of power-up, pushbutton 26 must be pushed. The first push resets the start time to twenty-four hours after that push. Each subsequent push of pushbutton 26 (made within a preset wait period) sets the start time back one hour from the first push. If, for example, a new start time of approximately 2:00 a.m. is desired and the current time is Tuesday, 10:15 a.m., a first push sets the time to 10:15 a.m. Wednesday. Eight additional pushes set the time back to 2:15 a.m. for Wednesdsay. An interval timer resets this function after a brief elapsed time, for example 10 seconds. If more than this time interval elapses between pushes of pushbutton 26, the function resets and the next push sets the start time anew to twenty-four hours after the push. Once a start time has been chosen, watering will always start at that time of day.

The controller now runs on its own. At the chosen start time, the four station connectors 16 through 22 are energized in sequence for the cycle length associated with the selected cycle setting. During this time, the LED associated with the chosen cycle setting repetitively flashes one blink while connector 16 is energized (Station 1), two blinks for connector 18 (Station 2), three blinks for connector 20 (Station 3), and four blinks for connector 22 (Station 4).

In one aspect of the invention, the stations iterate more than once during each watering cycle to reduce runoff by giving the water time to sink in. For example, in the low watering mode, a watering cycle may occur every third day. In each cycle, each station may be sequentially energized for four minutes, and the sequence of stations 16, 18, 20, 22 may be repeated twice more, immediately following the first sequence. Thus, each station will run 4 minutes on, 12 minutes off, three times in succession, for a total of 12 minutes of watering every third day.

Likewise, in the medium watering mode, each station may run three times for 7 minutes, for a total of 21 minutes every other day; and in the high watering mode, each station may run three times for 6 minutes, for a total of 18 minutes every day.

In an alternative embodiment, all watering for each station may occur at one time without repeats.

If a start time is encountered while the controller is in the no watering or off mode, the entire watering cycle is inhibited, and the controller remains inactive until another mode is selected. If a cycle is in progress when the user pushes button 26, the controller's action will not change until after the current cycle unless the cycle is set to the off mode and left in the off mode for more than 2–3 seconds. In that event, all stations go off until the next start time.

For manual watering, pushbutton 28 is pressed once. This immediately starts a watering sequence. Pressing pushbutton 28 again skips to the next station in the sequence. Pressing pushbutton 28 while terminal 22 is energized stops the manual watering. Manual watering may normally cause a single iteration of the stations for ten minutes each. Manual watering cannot be initiated while an automatic cycle is in progress.

During manual operation, the LED associated with the watering cycle currently selected for automatic operation blinks one or more times to identify the currently energized station. This makes it possible to check for open circuits or valve failures by monitoring the controller indication when a station fails to operate.

If a short circuit occurs in the wiring of a station, all four LEDs 30 through 36 repetitively flash together, blinking once if connector 16 is shorted, twice for connector 18, three times for connector 20, and four times for connector 22 to identify which station has the short. At the same time, the controller shuts off all stations to prevent a possibly damaging operation of the controller. Power must be turned off to remove this blinking even if the short condition is corrected.

Figure 4:
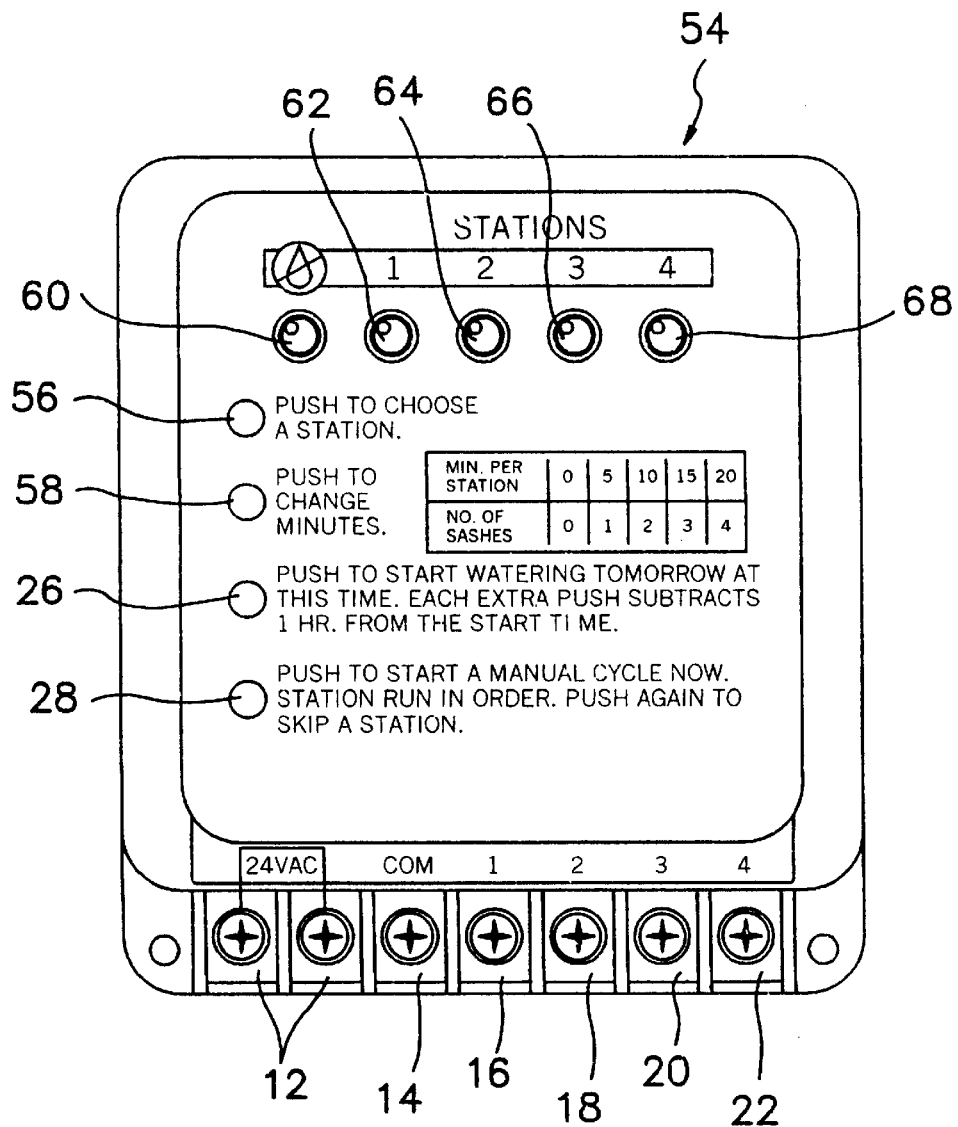
FIG. 4 is a front elevation of the face plate of an alternative embodiment of the invention.
Figure 5:
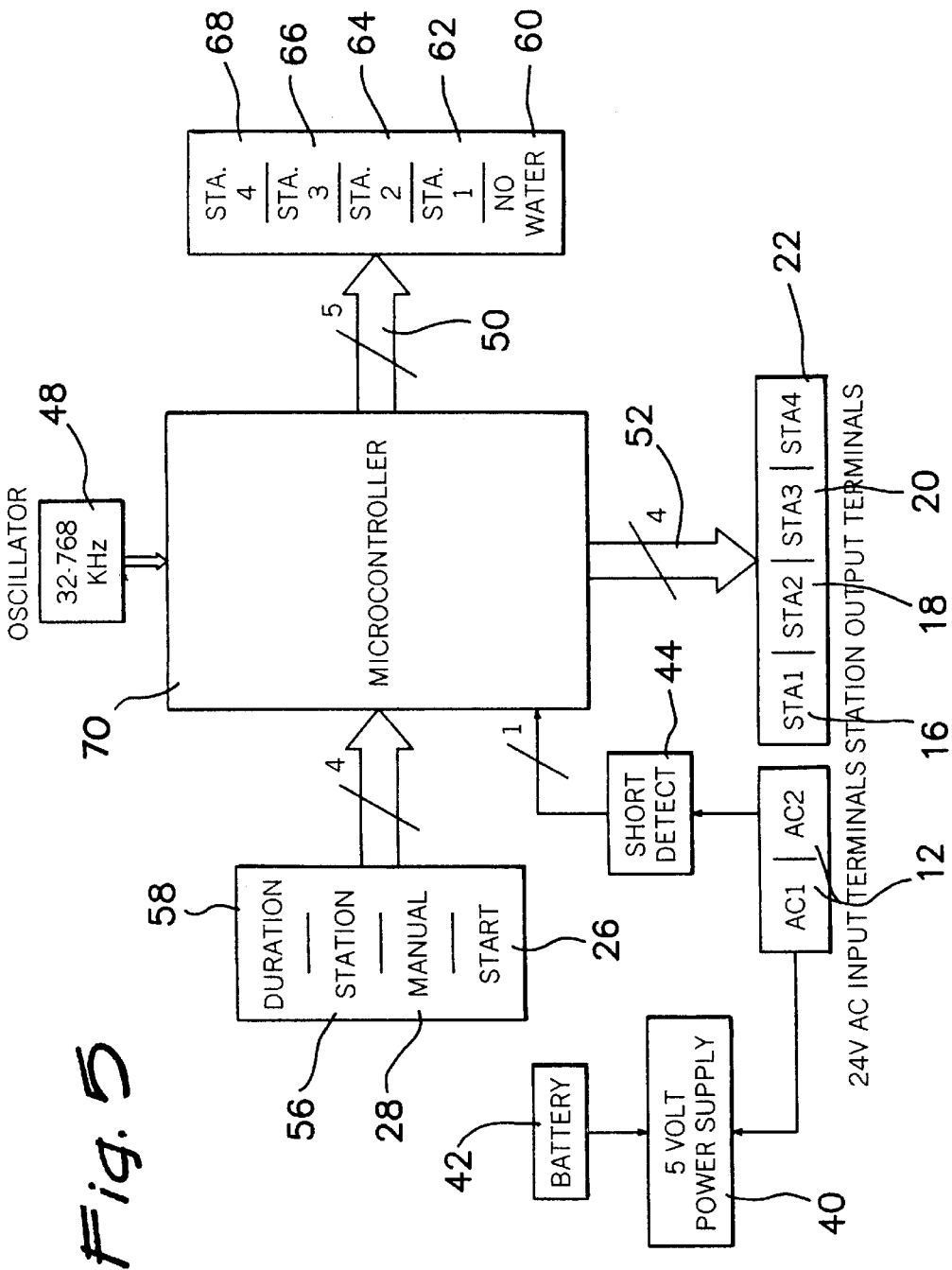
FIG. 5 is a block diagram of the circuitry of the controller of FIG. 4.

FIGS. 4 and 5 illustrate, an alternative embodiment of the invention. In the embodiment of FIGS. 4 and 5, each station is separately controllable as to the cycle duration, but the repetition rate is fixed at once a day.

As shown in FIG. 4, the alternative controller 54 has the same power input 12, the same common station terminal 14, and the same station outputs 16 through 22 as the controller 10 of FIG. 1. The start button 26 and the manual button 28 also function in the same way as they do in the controller 10. The difference between the embodiments of FIG. 1 and FIG. 4 is in the pushbuttons 56, 58 and in the LEDs 60, 62, 64, 66 and 68.

In the embodiment of FIGS. 4 and 5, the controller 54 may, for example, default on power-up to ten minutes per station once each day. As in the controller 10, the power-on default condition is signalled by a scrolling of the LEDs 60 through 68. To change the 5 default condition, button 56 is first pushed to select a station—once for Station 1, twice for Station 2, and so on. Pushing button 56 a fifth time turns the controller 54 off and lights the no-watering LED 60. Any push of button 56 stops the scrolling, and the chosen station's LED repetitively blinks twice, indicating a ten-minute cycle duration. Button 58 can now be pushed one or more times to select the desired cycle length for that station. Successive pressings of button 58 will select 0, 5, 10 15, or 20 minutes. Each selection is confirmed by the repetitive blinking of the pertinent one of LEDs 62–66 with zero to four blinks, respectively.

If button 58 is not pushed for five seconds, or more, the program of button 58 resets, and the next push will again select 0 minutes.

In the block diagram of FIG. 5, the microcontroller 70 functions essentially as shown in FIG. 3. The manual operation of controller 54 and its operation while a watering cycle is in progress are also essentially the same as described above in connection with controller 10.

A third embodiment of the invention is directed at those installations in which a single station needs to be operated with little or no supervision in an environment in which power is not readily available. Because such a controller needs to rely on long-term battery power in humid or otherwise adverse environments, fail-safe circuitry with very low power consumption must be used.

Figure 6:
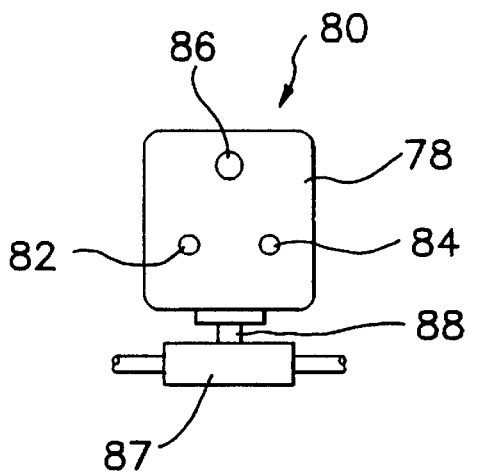
FIG. 6 is a front elevation of the face plate of a third embodiment of the invention.
Figure 7:
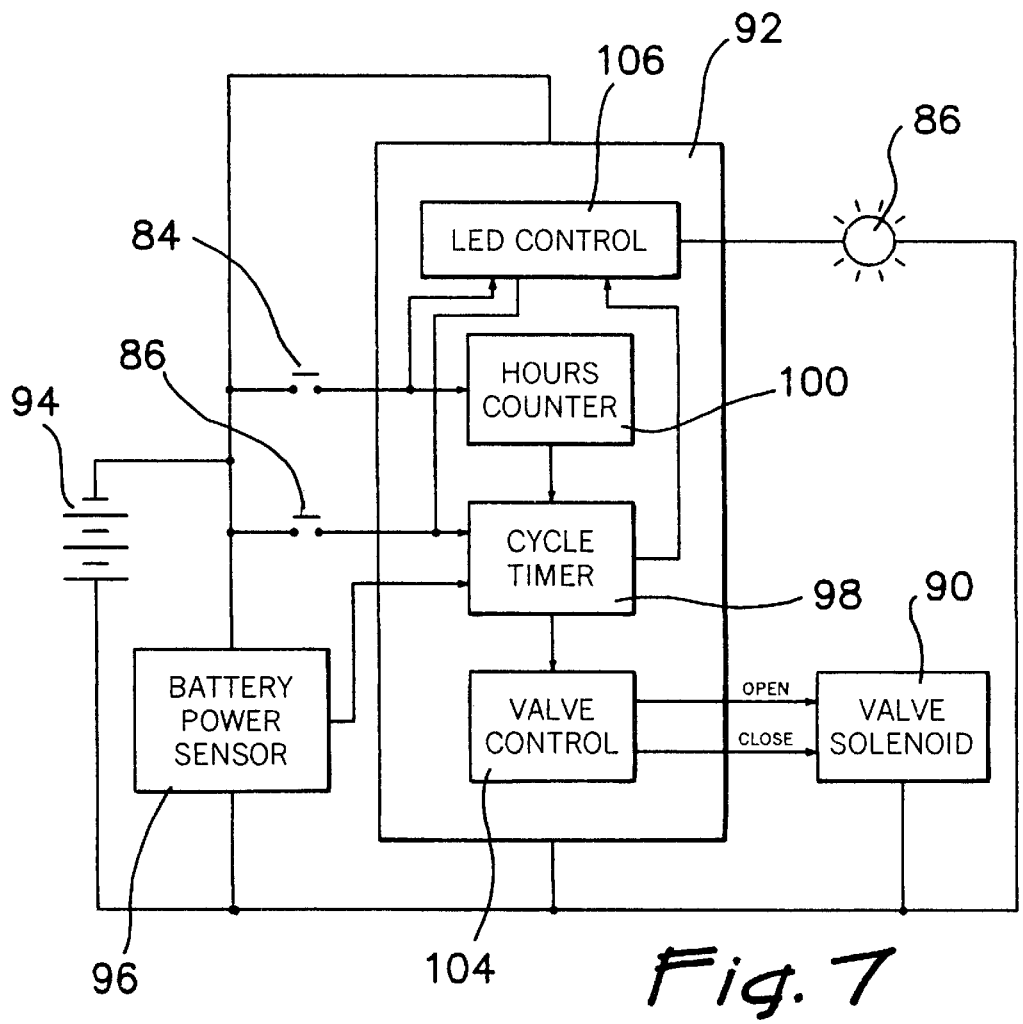
FIG. 7 is a block diagram of the circuitry of the controller of FIG. 6.
Figure 8:
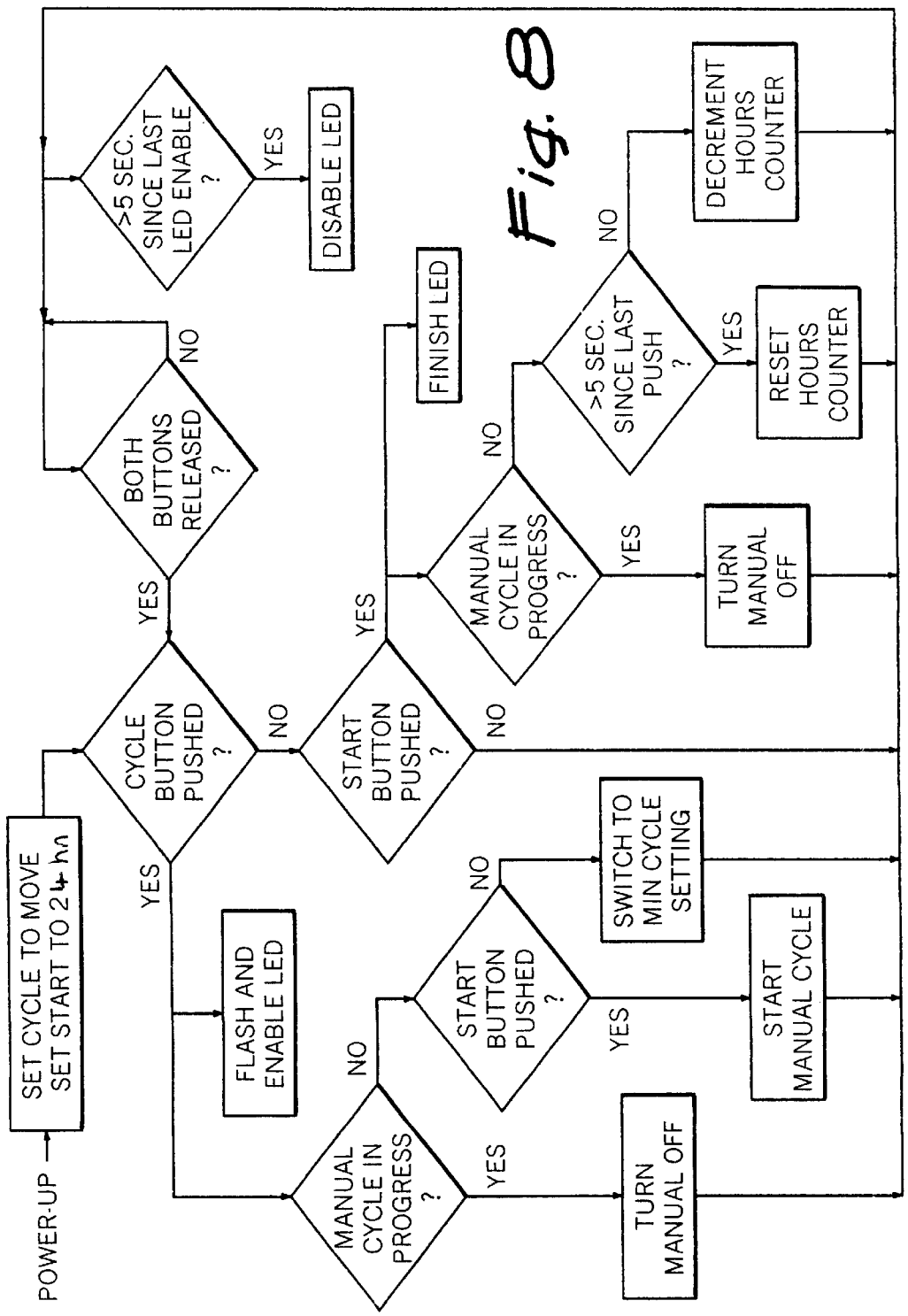
FIG. 8 is a partial flow diagram of the microprocessor of FIG. 7 illustrating the use of the pushbuttons of FIG. 6.

An embodiment satisfying these requirements is shown in FIGS. 6 through 8. In its sealed waterproof case 78 (FIG. 6), the single-station controller 80 has a cycle selection button 82, a start time selector button 84, and a single LED 86. The controller 80 is mounted on a conventional water valve 87 which is toggled between an open and a closed position by a plunger 88. The plunger 88 is in turn toggled between the open and closed positions by a latching solenoid 90 (FIG. 7), which is operated by momentary "open" and "close" signals from a microprocessor 92. Thus, the controller 80 consumes significant power only momentarily while switching from one valve state to the other.

The controller 80 is powered by a battery 94. Because a battery failure while the valve 87 is open could be catastrophic, a battery power sensor 96 is provided in the controller 80. When battery power drops below a predetermined safe level, the sensor 96 causes the cycle timer 98 in microprocessor 92 to close the valve 87 and lock itself in the "Off" mode until the battery 94 is replaced.

The microprocessor 92 includes four operational elements: an hours counter 100, the cycle timer 98, a valve actuator 104, and an LED control 106. The counter 100 cyclically counts off twenty-four one-hour intervals and then issues a start signal 108. to the cycle timer 98. The cycle timer 98 preferably includes a day counter and five selectable timing routines: Off (no watering), Some (e.g. 5 minutes every third day), More (e.g. 10 minutes every other day), Most (e.g. 20 minutes every day, preferably applied in two 10-minute cycles with an hour's delay between them), and Manual (e.g. 10 minutes). These routines (other than Manual) can be selected in the cycle timer 98 by successive pushes of the cycle selector button 82. The Manual routine is selected by pushing cycle selector button 82 and Start selector button 84 simultaneously. On power-up, the cycle timer 98 defaults to the More routine.

The cycle timer 98 provides "open" and "close" signals in accordance with the selected timing routine to the valve actuator 104, which in turn operates the locking solenoid 90 to open or close the water valve 87.

The LED control 106 causes the LED 86 to flash momentarily whenever button 82 or 84 is pushed, and to indicate the selected cycle routine by blinking, e.g. steady on for Off, one blink for Some, two blinks for More, and three blinks for Most. In Manual mode, the LED 86 remains off. In order to conserve power, the LED 86 is deactivated after five seconds.

FIG. 8 is a self-explanatory flow diagram illustrating the sequence of operation of the microprocessor 92. It should be noted that each push of the start button 84 decreases the hours counter 100 by one hour, so that the initial start time can be adjusted but each subsequent start occurs twenty-four hours (or a multiple of twenty-four hours in the Some and More modes) after the previous one. If the start button 84 has not been pushed for five seconds or more, the next push resets the hours counter 100 to its original setting.

It is to be understood that the exemplary irrigation controller described herein and shown in the drawings represent only presently preferred embodiments of the invention. Indeed, various modifications and additions may be made to such embodiments without departing from the spirit and scope of the invention. Thus, other modifications and additions may be obvious to those skilled in the art and may be implemented to adapt the present invention for use in a variety of different applications.

I claim:

1. An irrigation controller for residential sprinkler systems, comprising:

a) a set of repetitively actuable actuators;

b) a set of indicator lights;

c) a set of watering station terminals; and d) a microprocessor responsive to the repetitive actuation of a selected one of said actuators to selectively energize said watering station terminals in selected watering level modes, said microprocessor operating said indicators to convey information regarding the selected modes and energization status of said terminals;

e) said microprocessor operating said indicators so as to simultaneously convey said mode information and the identity of any energized terminal by a combination of flashing illumination and steady illumination of a single one of said indicator lights.

2. An irrigation controller for residential sprinkler systems, comprising:

a) a set of repetitively actuable actuators;

b) a set of indicators;

c) a set of watering station terminals; and d) a microprocessor actuated by said actuators to selectively energize said watering station terminals, said microprocessor operating said indicators to convey operating condition information regarding the status of said controller;

e) said microprocessor operating said indicators so as to convey said information by a combination of flashing illumination, steady illumination, and sequence of illumination of said indicators;

f) said watering station terminals being energizable by one of said repetitively actuable actuators in accordance with a selected one of a set of predetermined combinations of "on" times and repetition rates; and g) each of said set of indicators indicating both a selected one of said set of said predetermined combinations applied to a watering station terminal and the identity of a terminal energized at a given time.

3. An irrigation controller for residential sprinkler systems, comprising:

a) a set of repetitively actuable actuators;

b) a set of individually illuminable indicators;

c) a set of watering station terminals; and d) a microprocessor actuated by said actuators to selectively energize said watering station terminals, said microprocessor operating said indicators to convey operating condition information regarding the status of said controller;

e) said microprocessor operating said indicators so as to convey said information by a combination of flashing illumination, steady illumination, and sequence of illumination of said indicators;

f) said operating conditions of said watering station terminals about which information is conveyed by said combination including:

i) watering station run time;

ii) watering cycle repetition rate;

iii) controller power-up; and iv) watering station identity.

4. The controller of claim 3, in which at least said run time, cycle repetition rate, and watering station identity can be selected only by repetitive actuation of said repetitively actuable actuators.

* * * * *